(12) United States Patent
Kobayashi et al.

(10) Patent No.: US 12,509,238 B2
(45) Date of Patent: Dec. 30, 2025

(54) ELECTRIC AIRCRAFT AND METHOD FOR CONTROLLING AERODYNAMIC PERFORMANCE THEREOF INCLUDING DISTRIBUTION OF LIFT IN A WING

(71) Applicant: JAPAN AEROSPACE EXPLORATION AGENCY, Tokyo (JP)

(72) Inventors: Hiroshi Kobayashi, Tokyo (JP); Mari Nishiyama, Tokyo (JP); Akira Nishizawa, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 347 days.

(21) Appl. No.: 17/754,507

(22) PCT Filed: Jul. 29, 2020

(86) PCT No.: PCT/JP2020/029066
§ 371 (c)(1),
(2) Date: Apr. 4, 2022

(87) PCT Pub. No.: WO2021/065180
PCT Pub. Date: Apr. 8, 2021

(65) Prior Publication Data
US 2024/0109665 A1    Apr. 4, 2024

(30) Foreign Application Priority Data

Oct. 4, 2019 (JP) .................................. 2019-183379

(51) Int. Cl.
*B64D 31/16*    (2024.01)
*B64D 27/31*    (2024.01)
(Continued)

(52) U.S. Cl.
CPC ............. *B64D 31/00* (2013.01); *B64D 27/31* (2024.01); *B64D 27/34* (2024.01); *B64D 31/16* (2024.01); *B64D 35/04* (2013.01)

(58) Field of Classification Search
CPC .............................. B64C 15/14; G05D 7/0635
See application file for complete search history.

(56) References Cited

U.S. PATENT DOCUMENTS 3,730,459 A * 5/1973 Zuck ........................ B64C 3/38
244/48
3,831,376 A * 8/1974 Moorehead ............... F02K 1/70
239/265.29

(Continued)

FOREIGN PATENT DOCUMENTS

| CN | 105183974 A | 12/2015 |
| EP | 3 396 487 A1 | 10/2018 |
| JP | 2014-172435 A | 9/2014 |

OTHER PUBLICATIONS

International Search Report dated Oct. 13, 2020 in International Application No. PCT/JP2020/029066.
(Continued)

*Primary Examiner* — Jess Whittington
(74) *Attorney, Agent, or Firm* — SALIWANCHIK, LLOYD & EISENSCHENK (57) ABSTRACT

An electric aircraft includes: one or two or more electric propulsion systems each including a propeller or fan for propulsion disposed to contribute to a lift of a main wing and an electric motor that drives the propeller or fan; and a controller that adjusts the electric propulsion system on the basis of a relationship between a variable relating to an operating state of the electric propulsion system and an aerodynamic force generated on the main wing such that a total thrust by the electric propulsion systems or the aero-
(Continued)

dynamic force on the main wing has a predetermined value or falls within a predetermined range.

12 Claims, 8 Drawing Sheets

(51) Int. Cl.
   *B64D 27/34*   (2024.01)
   *B64D 31/00*   (2006.01)
   *B64D 35/04*   (2006.01)

(56) References Cited

U.S. PATENT DOCUMENTS

| | | | | |
|---|---|---|---|---|
| 3,850,388 | A * | 11/1974 | Olcott | B64C 13/0425 244/221 |
| 4,653,418 | A * | 3/1987 | Mori | B63H 25/38 114/162 |
| 9,751,614 | B1 * | 9/2017 | Nguyen | B64D 27/18 |
| 11,117,675 | B2 * | 9/2021 | Murrow | B64D 35/023 |
| 12,103,669 | B2 * | 10/2024 | NakaMats | B64C 29/0033 |
| 2012/0209456 | A1 | 8/2012 | Harmon et al. | |
| 2014/0257599 | A1 | 9/2014 | Kobayashi et al. | |
| 2015/0053824 | A1 * | 2/2015 | De Smet | B64C 11/002 244/175 |
| 2017/0057621 | A1 * | 3/2017 | Evulet | B64C 23/00 |
| 2018/0044010 | A1 * | 2/2018 | Groninga | B64C 27/82 |
| 2018/0058374 | A1 * | 3/2018 | Abel | F16F 9/3292 |
| 2018/0273193 | A1 * | 9/2018 | Summers | F02K 9/08 |
| 2018/0363481 | A1 * | 12/2018 | Bailey | F04D 29/362 |
| 2019/0047680 | A1 * | 2/2019 | Murrow | B64D 27/406 |
| 2019/0061963 | A1 * | 2/2019 | Sankrithi | B64D 27/33 |
| 2019/0136867 | A1 * | 5/2019 | Albrecht | B63H 3/082 |
| 2019/0250640 | A1 * | 8/2019 | O'Flaherty | B64U 10/14 |
| 2020/0115066 | A1 * | 4/2020 | De Munck | G06N 3/04 |
| 2022/0009626 | A1 * | 1/2022 | Baharav | B64C 27/26 |
| 2023/0075112 | A1 * | 3/2023 | Zha | B64C 9/38 |

OTHER PUBLICATIONS

Ikegami, T., et al., "Fundamental Study on Vertical and Longitudinal Force Control for Electric Airplane with Multiple Propellers," IEEJ International Workshop on Sensing, Actuation, and Motion Control, 2016, pp. 1-6.

Konishi, N., et al., "Lift Control of Electric Airplanes by Using Propeller Slipstream for Safe Landing," IEEE International Conference on Mechatronics (ICM), 2015, pp. 1-6.

Sato, M., et al., "Initial Acceleration Suppression via Gust Alleviation Controller Using Prior Gust Information," Journal of the Japan Society for Aeronautical and Space Sciences, 2008, 56(655):355-362.

Torizaki, T., et al., "FJR710 engine and STOL experimental aircraft "Asuka"", Turbomachinery, 1986, 14(3):138-144, Jul. 11, 2011 <URL:https://www.jstage.jst.go.jp/article/tsj1973/14/3/14_3_138/_pdf>.

* cited by examiner

ELECTRIC AIRCRAFT AND METHOD FOR CONTROLLING AERODYNAMIC PERFORMANCE THEREOF INCLUDING DISTRIBUTION OF LIFT IN A WING

CROSS-REFERENCE TO RELATED APPLICATIONS

This application is the U.S. national stage application of International Patent Application No. PCT/JP2020/029066, filed Jul. 29, 2020, which claims the benefit under 35 U.S.C. § 119 of Japanese Application No. 2019-183379, filed Oct. 4, 2019, the disclosures of each of which are incorporated herein by reference in their entirety.

TECHNICAL FIELD

The present invention relates to an electric aircraft using an electric propulsion system driven by an electric motor and to an aerodynamic performance control method for the electric aircraft.

BACKGROUND ART

In electric aircraft, energy sources such as a battery and a hydrogen tank that determine the cruising range account for a large proportion of the aircraft weight, and thus it is desirable to mount the energy sources in main wings from the viewpoint of reducing the structural weight. However, there are many cases where there is no degree of freedom in shape or the energy sources cannot withstand the stress corresponding to the deformation caused by an aerodynamic load of the main wings. Therefore, there has been a disadvantage that the aerodynamic performance of the main wings is greatly impaired when a main wing structure capable of mounting energy sources such as a battery and a hydrogen tank is adopted.

In addition, since the main wings of conventional aircraft are set to have the shape to maximize the aerodynamic performance during cruising, sufficient performance cannot be exhibited in other flight phases such as takeoff climb, and it is general to supplement the aerodynamic performance by mounting an aerodynamic control device that is used only in certain flight phases with flaps, slats, and the like. This has disadvantages in weight and further in impairing the aerodynamic performance in the flight phase.

Non-Patent Literature 1 describes the technology for acquiring a large lift not by using the shape of the main wing but by causing the slipstream of a propulsion system to act on the main wing. In addition, Patent Literature 1 and Non-Patent Literatures 2 to 4 are disclosed as the technologies relating to the present invention.

CITATION LIST

Patent Literature

Patent Literature 1: Japanese Patent Application Laid-open No. 2014-172435

Non-Patent Literature

Non-Patent Literature 1: https://www.jstage.jst.go.jp/article/tsj1973/14/3/14_3_138/_pdf
Non-Patent Literature 2: http://hflab.k.u-tokyo.ac.jp/papers/2016/samcon_ikegami.pdf
Non-Patent Literature 3: http://hflab.k.u-tokyo.ac.jp/papers/2015/ICM2015_konishi.pdf
Non-Patent Literature 4: Journal of the Japan Society for Aeronautical and Space Sciences Vol. 56, No. 655, pp. 355-362, 2008

DISCLOSURE OF INVENTION

Technical Problem

It is an object of the present invention to provide an electric aircraft and an aerodynamic performance control method therefor that are capable of optimizing aerodynamic performance of a wing in each flight phase or an emergency such as gust action without depending on the shape of a wing.

Solution to Problem

To achieve the above object, an electric aircraft according to an embodiment of the present invention includes: one or two or more electric propulsion systems each including a propeller or fan for propulsion disposed to contribute to a lift of a wing, and an electric motor that drives the propeller or fan; and a controller that adjusts the electric propulsion system on the basis of a relationship between a variable relating to an operating state of the electric propulsion system and an aerodynamic force generated on the wing such that a total thrust by the electric propulsion systems or the aerodynamic force has a predetermined value or falls within a predetermined range.

The variable relating to the operating state of the electric propulsion system is typically a specific thrust, but it may be a ratio of the thrust and a dynamic pressure, for example.

In the present invention, a plurality of electric propulsion systems are typically installed in the span direction of a main wing, and the dynamic pressure of the slipstream of the electric propulsion system acting on the wing is increased or decreased by the adjustment of the operating state by the electric propulsion system, so that the lift distribution of the main wing is always kept at a desirable distribution in each flight phase or an emergency such as gust action. This allows the aerodynamic performance of the wing to be optimized in each flight phase or an emergency such as gust action without depending on the shape of the wing.

In other words, in the present invention, the electric propulsion system that is highly responsive and in which the distributed propulsion system in large numbers is easy to perform is used, so that the optimal aerodynamic performance can be easily obtained in any flight phase, and a heavy object can be mounted in the main wing and thus a reduction in structural weight or a drastic extension of cruising performance can be expected.

In the electric aircraft according to an embodiment of the present invention, the controller is capable of adjusting a thrust by the electric propulsion system to a negative value.

In the electric aircraft according to an embodiment of the present invention, when the variable relating to the operating state of the electric propulsion system changes, the controller adjusts the electric propulsion system on the basis of the relationship between the variable relating to the operating state of the electric propulsion system and the aerodynamic force generated on the wing such that the total thrust by the electric propulsion systems or the aerodynamic force has a predetermined value or falls within a predetermined range.

In the electric aircraft according to an embodiment of the present invention, when a variable relating to an operating state based on airflow information around the aircraft changes, the airflow information being obtained around the aircraft, or when a variable relating to an airflow state based on airflow information around the aircraft changes, the airflow information being obtained around the aircraft, the controller adjusts the electric propulsion system on the basis of the relationship between the variable relating to the operating state of the electric propulsion system and the aerodynamic force generated on the wing such that the total thrust by the electric propulsion systems or the aerodynamic force has a predetermined value or falls within a predetermined range. In the electric aircraft according to an embodiment of the present invention, when a variable relating to an operating state based on airflow information around the aircraft changes, the airflow information being obtained through communication from ground facility or by a mounted lidar or radar, or when a variable relating to an airflow state based on airflow information around the aircraft changes, the airflow information being obtained through communication from ground facility or by a mounted lidar or radar, the controller adjusts the electric propulsion system on the basis of the relationship between the variable relating to the operating state of the electric propulsion system and the aerodynamic force generated on the wing such that the total thrust by the electric propulsion systems or the aerodynamic force has a predetermined value or falls within a predetermined range.

In the present invention, the combination of an airspeed detection function with sensors such as a lidar and a radar can guarantee the safety of the aircraft and the occupants even when the aircraft is subjected to a gust wind.

The electric aircraft according to an embodiment of the present invention includes a storage device that stores a data group of the relationship between the variable relating to the operating state of the electric propulsion system and the aerodynamic force generated on the wing.

In the electric aircraft according to an embodiment of the present invention, the controller learns, as training data, one or more of a rotation speed, an output, a thrust, or a pitch angle of the propeller, a motor torque of the electric motor, a current, a voltage, the lift of the wing, or processing information thereof, and obtains the relationship between the variable relating to the operating state of the electric propulsion system and the aerodynamic force generated on the wing from information relating to the rotation speed of the propeller, a motor output or the motor torque of the electric motor, or the processing information thereof.

An aerodynamic performance control method for an electric aircraft according to an embodiment of the present invention includes: driving one or two or more propellers or fans for propulsion disposed to contribute to a lift of a wing by respective electric motors; and adjusting an electric propulsion system including the propeller or fan for propulsion and the electric motor on the basis of a relationship between a variable relating to an operating state of the electric propulsion system and an aerodynamic force generated on the wing such that a total thrust by the electric propulsion systems or an aerodynamic force has a predetermined value or falls within a predetermined range.

Advantageous Effects of Invention

According to the present invention, it is possible to optimize aerodynamic performance of a wing in each flight phase or an emergency such as gust action without depending on the shape of a wing.

MODE(S) FOR CARRYING OUT THE INVENTION

Hereinafter, embodiments of the present invention will be described with reference to the drawings.

First Embodiment

Figure 1:
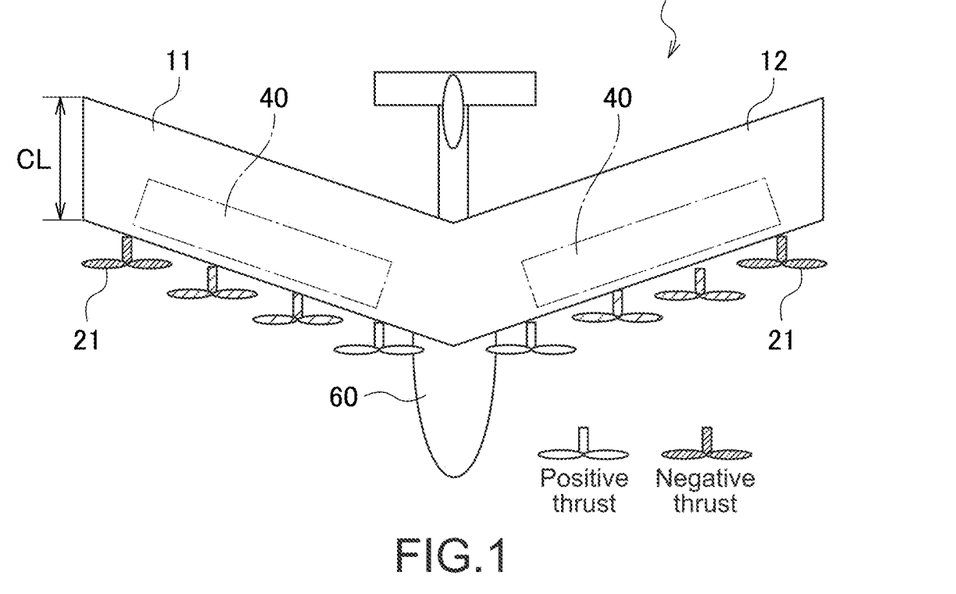
FIG. 1 is a plan view showing a configuration of an electric aircraft according to a first embodiment of the present invention.
Figure 2:
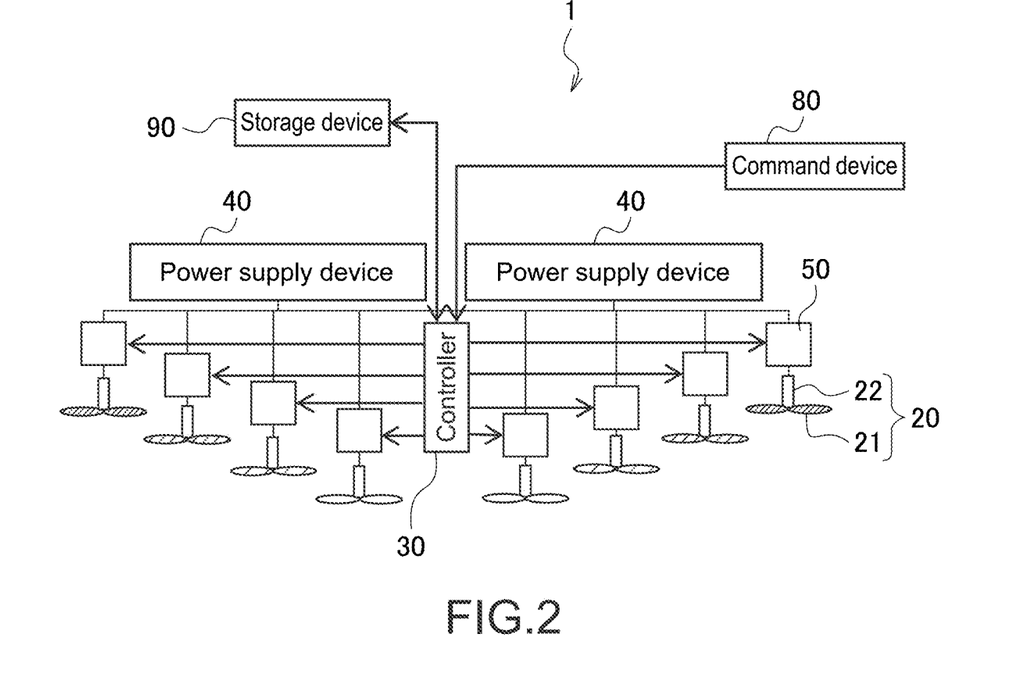
FIG. 2 is a block diagram showing the configuration of the electric aircraft according to the first embodiment of the present invention.

FIG. 1 is a plan view of an electric aircraft according to a first embodiment of the present invention, and FIG. 2 is a block diagram showing the configuration thereof.

As shown in FIGS. 1 and 2, an electric aircraft 1 according to this embodiment includes a plurality of, in this case, four electric propulsion systems 20, each of which includes a propeller 21, at each leading edge of a left main wing 11 and a right main wing 12 of a fuselage 60 such that the slipstream of the electric propulsion systems 20 acts on the main wings 11 and 12. Each electric propulsion system 20 includes the propeller 21 and an electric motor 22. Each propeller 21 is disposed in a forward portion or at the front of each of the main wings 11 and 12 so as to contribute to the lift of the main wings 11 and 12.

The electric aircraft 1 includes a controller 30 that adjusts the drive of the electric motor 22. The controller 30 typically controls an inverter 50 interposed between a power supply device 40 and the electric motor 22 to provide power to the electric motor 22 and generate a thrust of the propeller 21, and to extract wind power serving as power through the propeller 21.

In the electric aircraft 1 according to this embodiment, the power supply device 40 is accommodated in, for example, each of the main wings 11 and 12. Further, the electric aircraft 1 has a function to regenerate or a function to reversely rotate the propeller 21 by generating electricity by the electric motor 22.

The controller 30 receives an output command value from an external command device 80 such as a throttle or a wireless control device and transmits an output command to each inverter 50 so as to maintain the total thrust by the electric propulsion systems 20 without unnecessarily changing a flight state such as an airspeed or an altitude.

Figure 3:
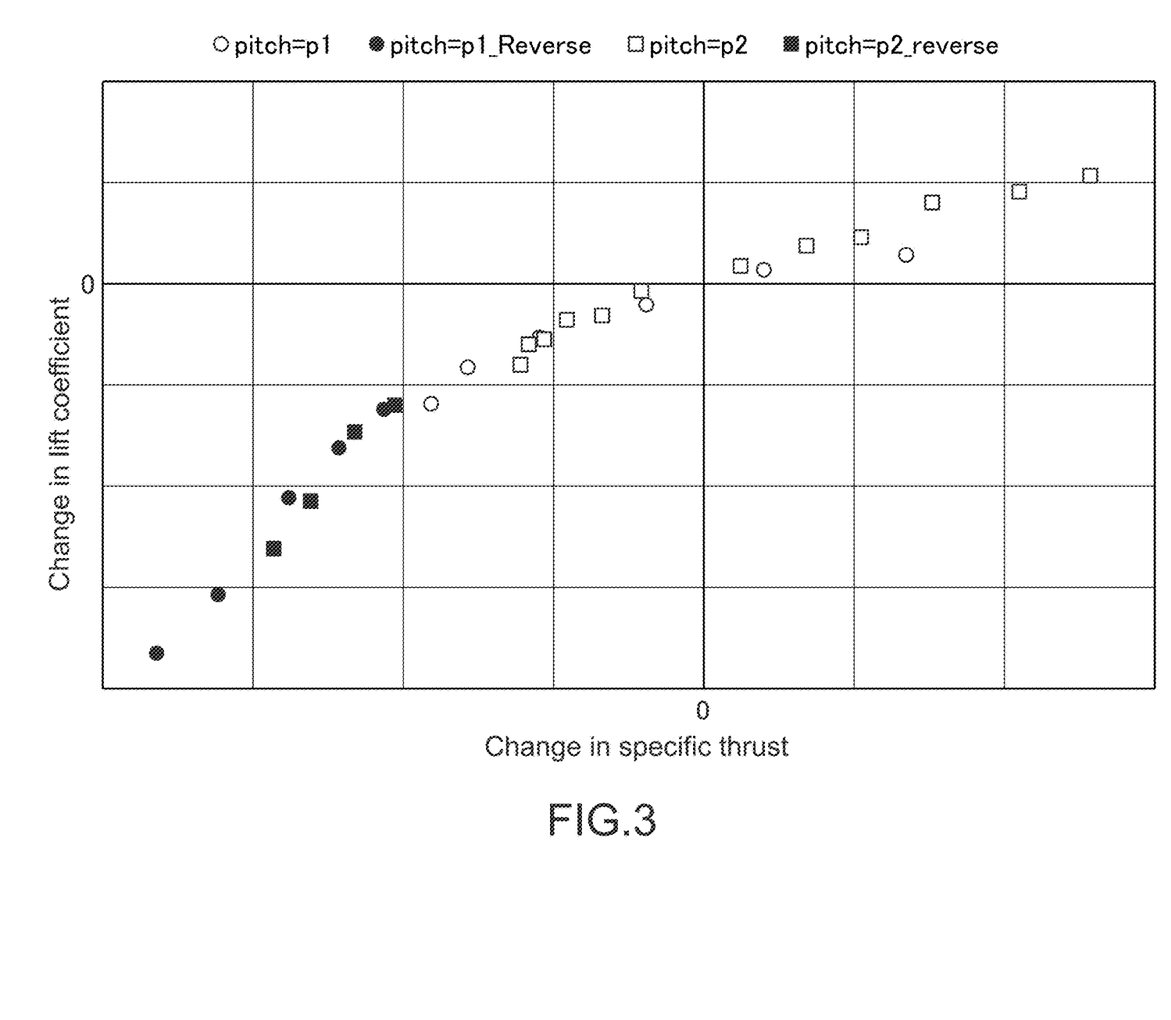
FIG. 3 is a graph showing a relationship between a change in specific thrust and a change in lift coefficient according to the first embodiment of the present invention.
Figure 4:
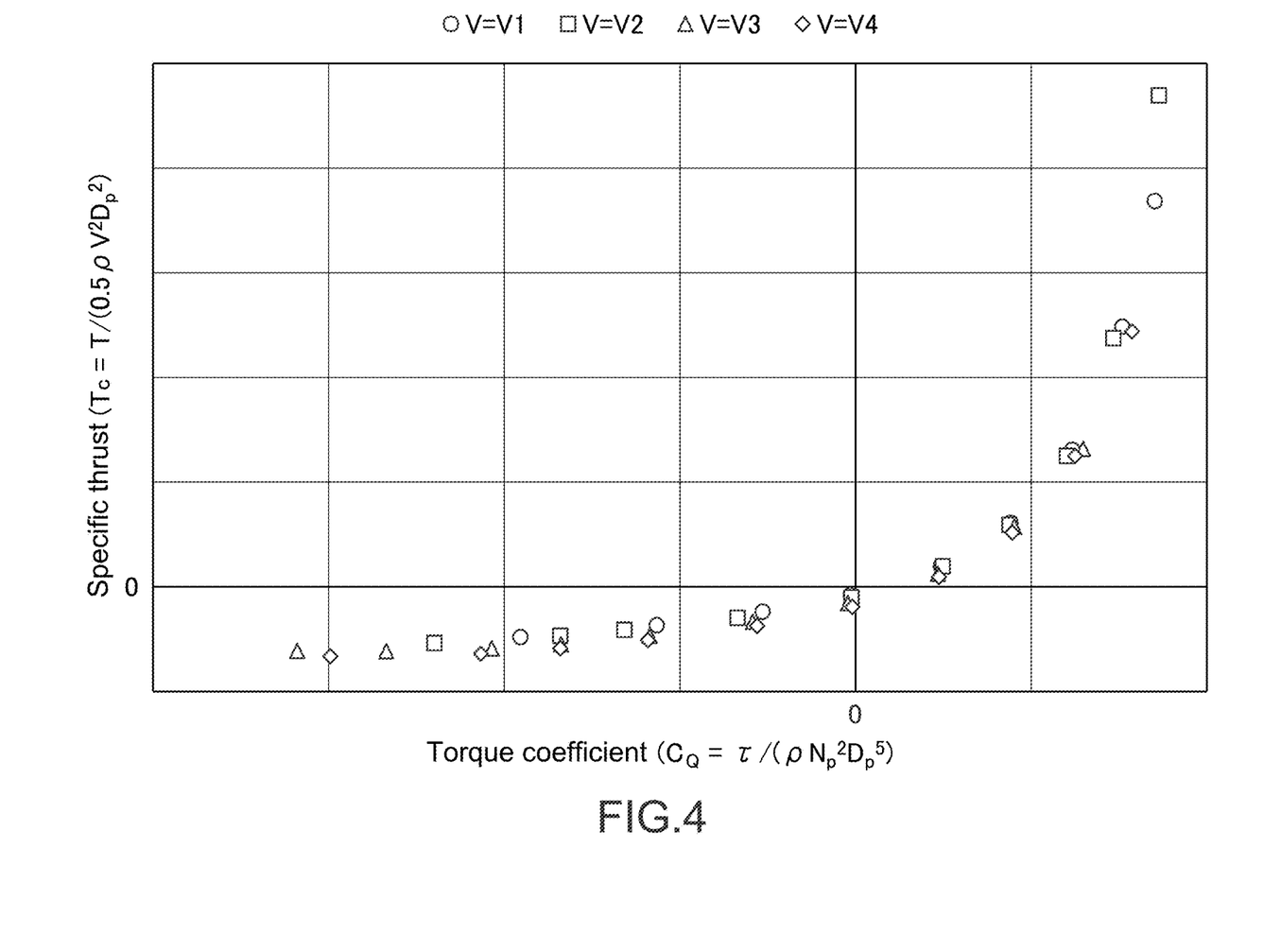
FIG. 4 is a graph showing a relationship between a torque coefficient and the specific thrust according to the first embodiment of the present invention.

The electric aircraft 1 according to this embodiment includes a storage device 90 that stores a data group of a relationship between a variable relating to an operating state of the electric propulsion system 20 and an aerodynamic force generated on the main wings 11 and 12. FIG. 3 is a graph showing a relationship between a change in specific thrust and a change in lift coefficient. FIG. 4 shows a relationship between a torque coefficient $C_Q$ and a specific thrust $T_c$, which are the variables relating to the operating state of the electric propulsion system 20. The storage device 90 stores those relationships shown in FIGS. 3 and 4 as data groups. Note that the variable relating to the operating state, which can be used as a data group, may be a power coefficient, a forward ratio, or the like.

Here, the torque coefficient $C_Q$ is as follows.

$$C_Q = \tau/(\rho N_P^2 D_P^5)$$

The specific thrust $T_c$ is as follows.

$$T_c = T/(0.5 \rho V^2 D_P)$$

where ($N_P$: propeller rotation speed, $\tau$: propeller torque, $D_P$: propeller diameter, $\rho$: atmospheric density).

Specifically, the storage device 90 stores data groups relating to the propeller rotation speed $N_P$, the propeller torque $\tau$, the propeller diameter $D_P$, the atmospheric density $\rho$, and the like, which are parameters indicating the operating state of the electric propulsion system 20, and the lift coefficient.

The controller 30 adjusts the operation state of the electric propulsion system 20 on the basis of the data group stored in the storage device 90 and controls the coefficient distribution of the lift of the main wings 11 and 12 in the slipstream of the propellers 21.

Note that airspeed detecting means such as a Pitot tube is usually required to detect the atmospheric density $\rho$. However, the technology described in Patent Literature 1 may be adopted to estimate the atmospheric density p from the operating state without using the airspeed detecting means.

Here, in order to minimize the induced drag, the main wings of ordinary aircraft are provided with the distribution of the chord length or mounting angle in the span direction such that the lift distribution in the span direction takes a distribution close to an elliptical shape.

For example, the distribution in which the chord length gradually decreases as it approaches the wing tip is generally provided. However, if a hydrogen tank for which a cylindrical shape is desirable is mounted in the main wing, for example, such a shape of the main wing does not have a sufficient wing thickness to house the tank, with a decreasing the chord length at a position close to the wing tip, and sufficient energy cannot be loaded.

Conversely, if the chord length is kept large to the wing tip such that the wing thickness does not become insufficient, the loading volume can be ensured, but the induced drag greatly increases, which impairs the aerodynamic performance of the aircraft.

In contrast, in the electric aircraft 1 according to this embodiment, the slipstream of each propeller 21 at the front of the main wings 11 and 12 is caused to act on each of the main wings 11 and 12, so that the distribution of the local lift coefficient of the main wings 11 and 12 is controlled by the operating state of the propeller 21 as described above.

Specifically, as shown in FIG. 1, in the main wings 11 and 12 whose chord length CL is uniformly distributed in the span direction, the thrust is decreased and the lift coefficient is decreased in the propeller 21 closer to the wing tip, so that the lift distribution in the span direction is adjusted to have a shape close to an ellipse.

Note that the propellers 21 are displayed in gray scale in FIG. 1, and those having a color closer to white have a larger thrust, and those having a color closer to black have a smaller thrust.

At that time, the propeller 21 close to the wing tip is caused to perform regeneration or reverse operation to adjust the thrust to a negative value, so that the adjustment range of the lift coefficient can be set wider, that is, an ideal lift distribution can be obtained for more diverse shapes of the main wing.

Note that the positive thrust is a thrust with respect to the flight direction, and the above-mentioned negative thrust is a thrust in the direction opposite to the flight direction.

Note that the electric aircraft 1 according to this embodiment includes the storage device 90 that stores the data group of the relationship between the variable relating to the operating state of the electric propulsion system 20 and the aerodynamic force generated on the main wings 11 and 12. However, for example, if it is difficult to provide the data group relating to the variable relating to the operating state of the electric propulsion system 20 and the aerodynamic force in advance, the controller 30 is provided with a configuration in which a relationship between a propeller rotational speed or the like during flight or in a ground test and the aerodynamic force of the wing is learned as will be described later, so that the configuration of the storage device 90 becomes unnecessary. In addition, it is possible to perform appropriate control even when the above-mentioned relationship between the rotational speed or the like and the aerodynamic force is changed due to the change of the properties of the propeller 21 and the main wings 11 and 12 resulting from adhesion of insects and dirt to the surface, for example.

Second Embodiment

Figure 5:
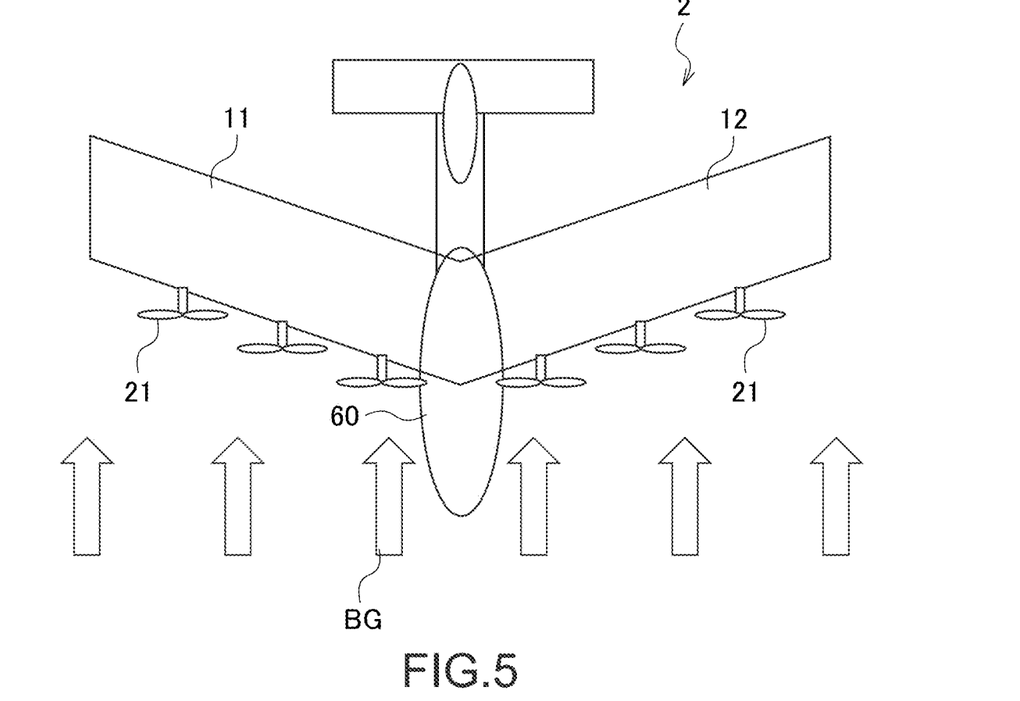
FIG. 5 is a plan view showing a configuration of an electric aircraft according to a second embodiment of the present invention.
Figure 6:
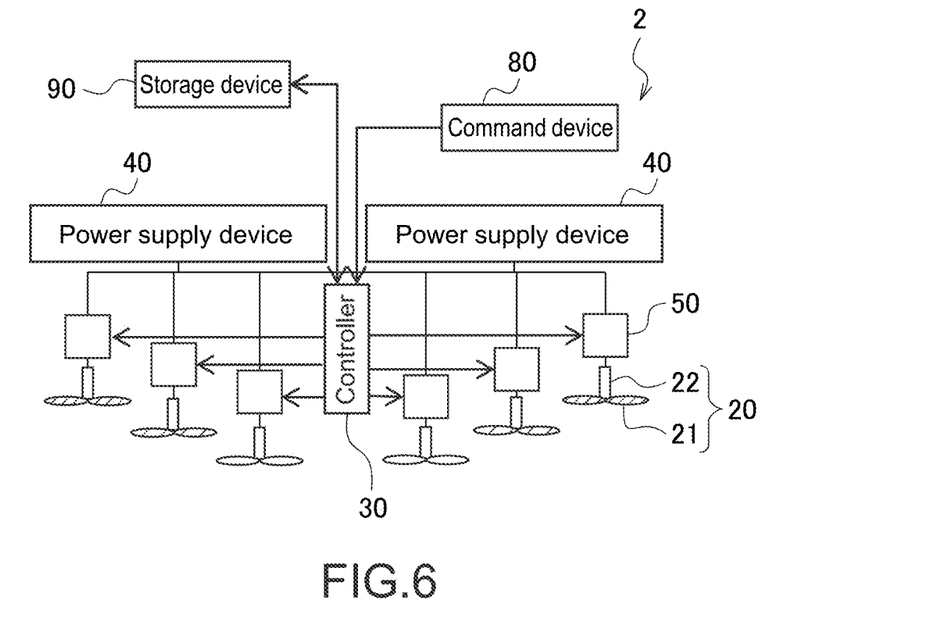
FIG. 6 is a block diagram showing the configuration of the electric aircraft according to the second embodiment of the present invention.

FIG. 5 is a plan view of an electric aircraft according to a second embodiment of the present invention, and FIG. 6 is a block diagram of the configuration thereof. In the second embodiment, the same elements as those of the first embodiment are denoted by the same reference numerals.

As shown in FIGS. 5 and 6, an electric aircraft 2 according to this embodiment includes a plurality of, in this case, three electric propulsion systems 20, each of which includes a propeller 21, at each leading edge of a left main wing 11 and a right main wing 12 of a fuselage 60 such that the slipstream of the electric propulsion systems 20 acts on the main wings 11 and 12. Each electric propulsion system 20 includes the propeller 21 and an electric motor 22. Each propeller 21 is disposed in a forward portion or at the front of each of the main wings 11 and 12 so as to contribute to the lift of the main wings 11 and 12.

The electric aircraft 2 includes a controller 30 that adjusts the drive of the electric motor 22. The controller 30 typically controls an inverter 50 interposed between a power supply device 40 and the electric motor 22 to provide power to the electric motor 22 and generate a thrust of the propeller 21, and to extract wind power serving as power through the propeller 21.

In the electric aircraft 2 according to this embodiment, the power supply device 40 is accommodated in, for example, each of the main wings 11 and 12. Further, the electric aircraft 2 has a function to regenerate or a function to reversely rotate the propeller 21 by generating electricity by the electric motor 22.

The controller 30 receives an output command value from an external command device 80 such as a throttle or a wireless control device and transmits an output command to each inverter 50 so as not to unnecessarily change a flight state such as an airspeed or an altitude.

The electric aircraft 2 according to this embodiment includes a storage device 90 that stores a data group (e.g., the data groups shown in FIGS. 3 and 4) of a relationship between a variable relating to an operating state of the electric propulsion system 20 and an aerodynamic force generated on the main wings 11 and 12. Note that, in this embodiment as well, one or more of a rotation speed, an output, a thrust, or a pitch angle of the propeller, a motor torque of the electric motor, a lift of the main wing, or processing information thereof may be learned as training data, and data corresponding to the data obtained from the data group may be obtained from information relating to the rotation speed of the propeller, a motor output or the motor torque of the electric motor, a current, a voltage, or the processing information thereof. Thus, the configuration of the storage device 90 becomes unnecessary. In addition, it is possible to perform appropriate control even when the above-mentioned relationship between the rotation speed or the like and the aerodynamic force is changed due to the change of the properties of the propeller 21 and the main wings 11 and 12 resulting from adhesion of insects and dirt to the surface, for example. For the learning described above, typically, known techniques of machine learning can be widely used. In particular, a neural network, Bayesian inference, regression tree, or ensemble learning using a combination thereof can be suitably used. The prediction accuracy can be further improved by using the ensemble learning in which the results of learning obtained by a plurality of techniques including the regression tree are combined.

Here, the wing of the aircraft during flight obtains a lift by the airflow from the front, but the airspeed of the aircraft is not constantly equal to the ground speed. The influence of wind such as wind gust is superimposed on the ground speed, and the generated lift and a bending moment of the wing caused by the lift are also affected by the wind.

As shown in FIG. 6, when a wind gust BG from the advance direction acts on the aircraft during steady flight, the airspeed increases suddenly, and thus the lift (acceleration) and the bending moment of the main wing also increase. Since the aircraft structure receives the acceleration or load larger than that in the previous flight state, in order to ensure the structural safety and the safety of occupants, the generated acceleration or load is conventionally intended to be reduced by the operation of the control surface or the like.

In contrast, in the electric aircraft 2 according to this embodiment, the operating states of the propellers 21 installed at the leading edges of the main wings 11 and 12 and distributed in the span direction are individually changed, and thus the lift distribution of the main wings 11 and 12 is adjusted so as to reduce the acceleration or load caused by the wind gust BG.

Figure 7:
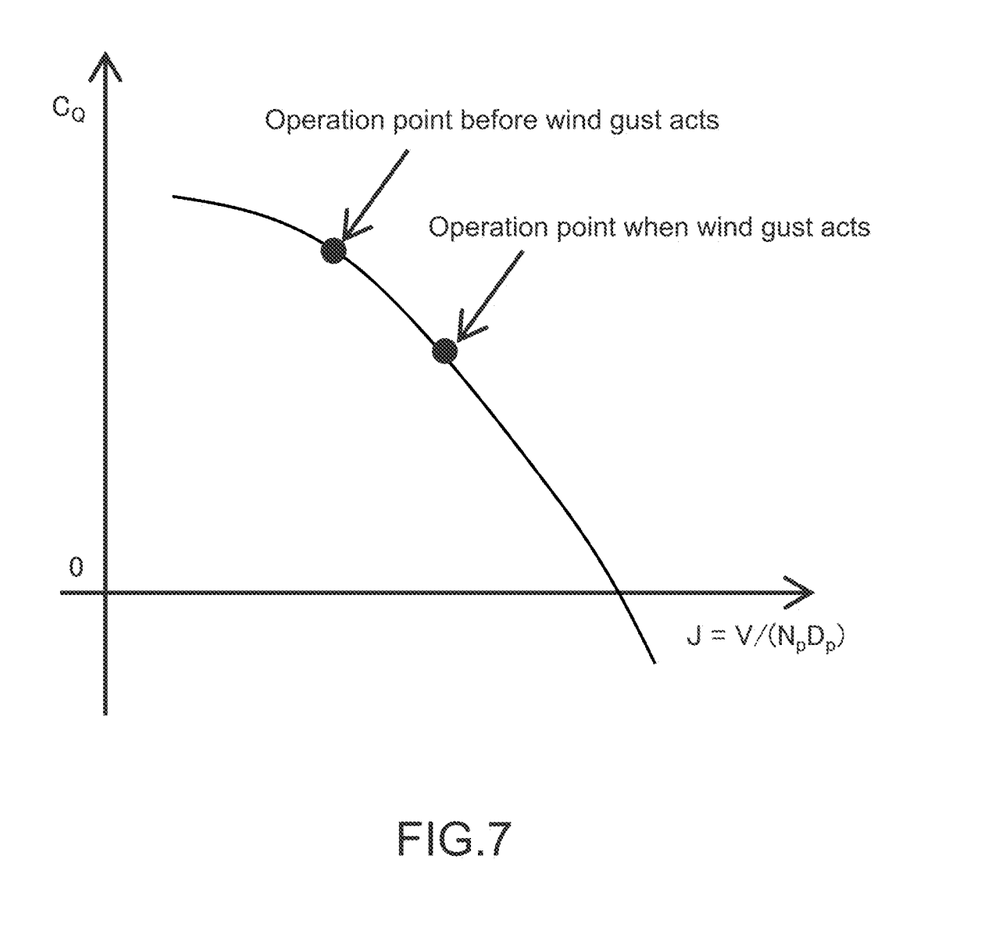
FIG. 7 is a graph showing a relationship between a torque coefficient C Q and an advance ratio J according to the second embodiment of the present invention.
Figure 8:
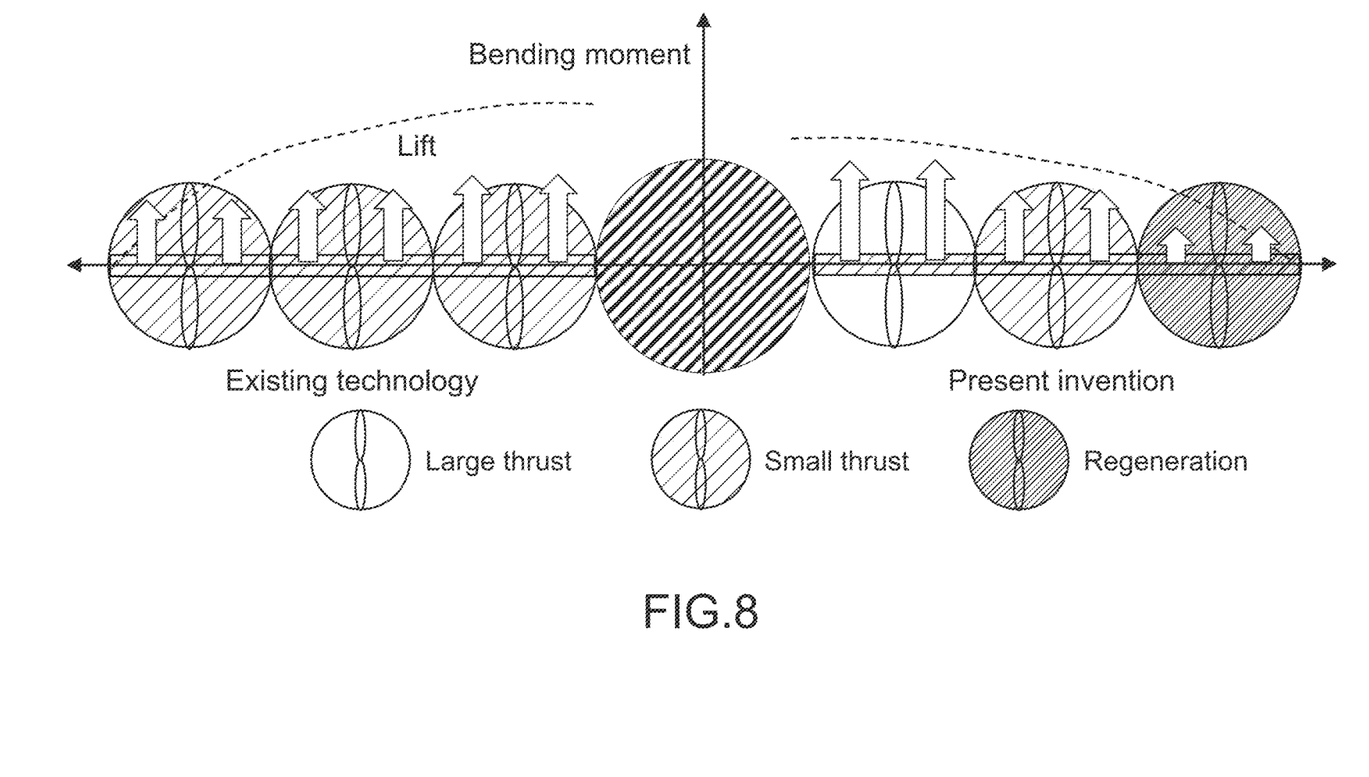
FIG. 8 is a diagram showing the distribution of bending moment acting on the electric aircraft when viewed from the front of the electric aircraft according to the second embodiment of the present invention.

Since the state of the airflow flowing into the propellers 21 is changed when the wind gust BG acts, the operation point of the propeller 21 is changed from the relationship shown in FIG. 7. Specifically, since the torque or rotation speed (torque coefficient $C_Q$) of the propeller 21 is changed, the action of the wind gust BG is detected as a change in advance ratio ($J=V(N_P D_P)$), and the controller 30 reduces the thrusts of some of the propellers 21 or switches the operating state to the regenerative operation by using the relationships of FIGS. 3 and 4. Thus, it is possible to adjust the lift distribution of the main wings 11 and 12 so as to alleviate the change in the lift (acceleration) and the bending moment, for example, as shown in FIG. 8.

In the electric aircraft 2 according to this embodiment, by alleviating the change in acceleration of the aircraft and in load of the structure by the wind gust BG as described above, it is possible to improve the safety of the occupants and passengers and to reduce strength requirements required for the aircraft structure, that is, reduce the structural weight.

Figure 9:
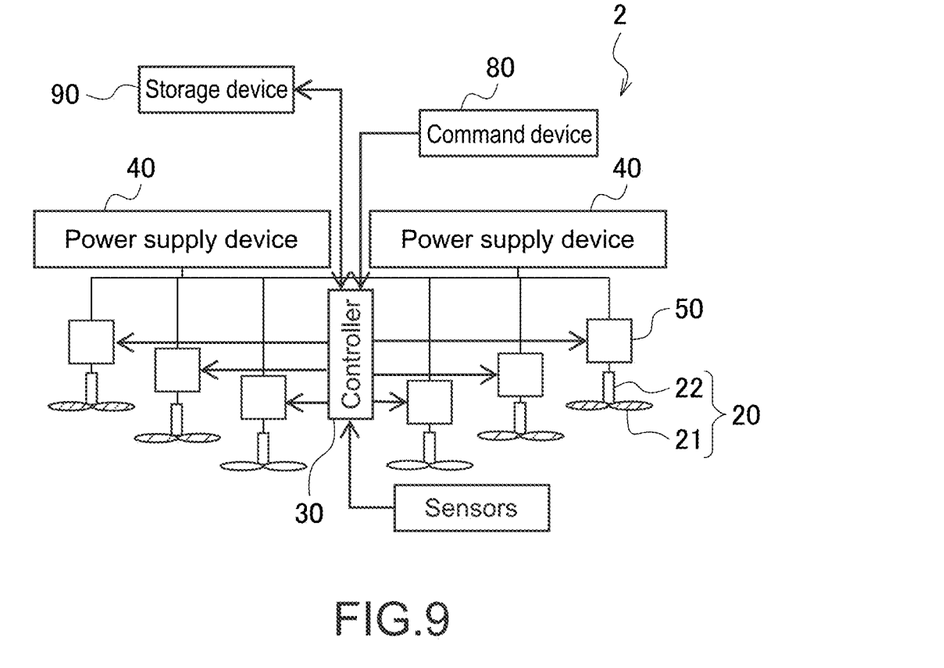
FIG. 9 is a block diagram showing a configuration of an electric aircraft according to a third embodiment of the present invention.
Figure 10:
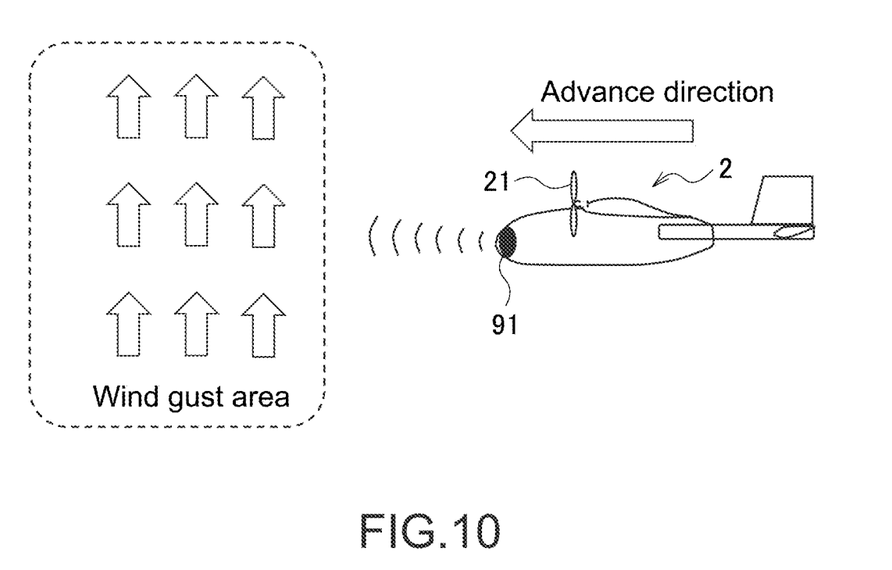
FIG. 10 is an explanatory view of a first aspect of the electric aircraft according to the third embodiment of the present invention.
Figure 11:
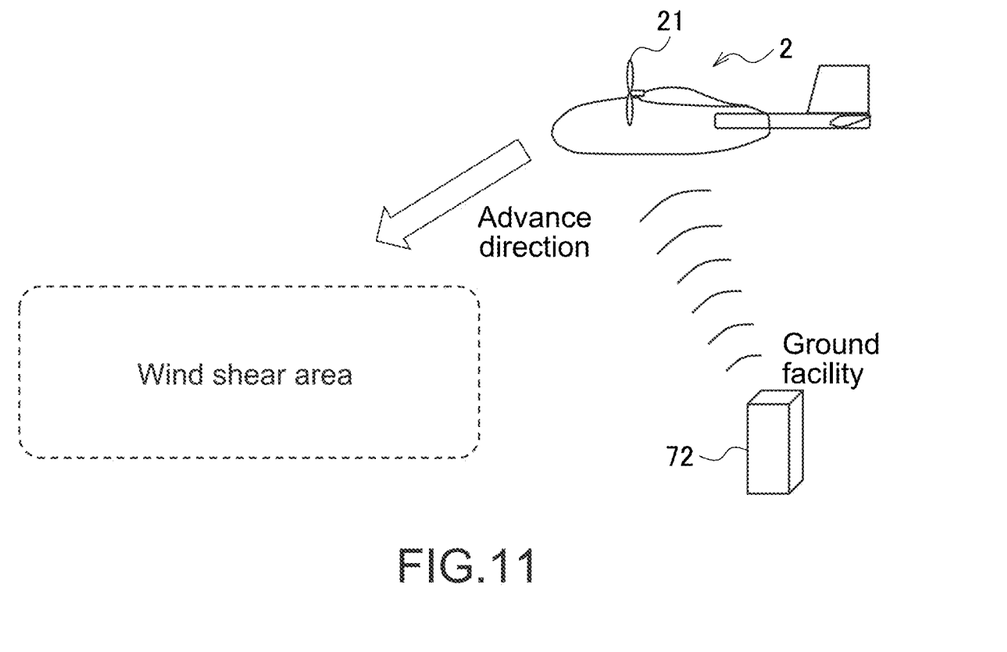
FIG. 11 is an explanatory view of a second aspect of the electric aircraft according to the third embodiment of the present invention.

Note that, in the electric aircraft 2 according to this embodiment, as shown in FIGS. 9 and 10, if a lidar 91 or the like, which is capable of acquiring information of an airflow in front of the aircraft in advance, is mounted on the aircraft or if the following configuration is provided, in which airflow information in the advance direction can be obtained through communication from ground facility 92 that has obtained the airflow information in the peripheral airspace by using a lidar or the like as shown in FIG. 11, an output command corresponding to the operation of the control surface to cancel the load or acceleration received from the wind gust BG is transmitted to each inverter 50 from the controller 30. Thus, it is possible to suppress the change in the acceleration or load to be smaller.

CONCLUSION

According to the embodiments as described above, since the main wing structure can be effectively used as a mounting location for a battery or the like, the cruising performance, which is a weak point of the electric aircraft, can be greatly improved. In addition, it is possible to improve the safety of small aircraft, which has a much higher accident rate than that of passenger aircraft while being regarded as a new major market as typified by flying cars in the future, and thus the possibility of industrial use is extremely high.

Others

Although the embodiments of the present invention have been described above, the present invention is not limited to the embodiments described above, and various modifications may be made thereto.

For example, in the embodiments described above, the electric aircraft includes the propeller for propulsion, but fans for propulsion may be used instead of the propeller for propulsion.

Further, in the embodiments described above, the example in which a plurality of electric propulsion systems are provided in the main wing has been described, but the present invention can also be applied to a wing including one or two or more electric propulsion systems.

Furthermore, in the embodiments described above, the example in which the propeller is regenerated or reversely rotated has been described, but the electric aircraft according to the present invention may have a configuration in which the propeller or the fan is not regenerated or reversely rotated.

REFERENCE SIGNS LIST 1, 2 electric aircraft
11, 12 main wing
20 electric propulsion system
21 propeller
22 electric motor
30 controller
40 power supply device
50 inverter
60 fuselage
80 command device
90 storage device
91 lidar
92 ground facility

The invention claimed is:

1. An electric aircraft, comprising:
a plurality of electric propulsion systems, each electric propulsion system including
a propeller or fan for propulsion disposed at a front of a wing to contribute to a lift of the wing due to an act of a slipstream of the propeller or fan on the wing at a rear of the slipstream of the propeller or fan, and an electric motor that drives the propeller or fan; and
a controller that adjusts each electric propulsion system on a basis of a relationship between at least one variable relating to an operating state of the respective electric propulsion system and the lift generated on the wing such that a parameter has a predetermined value or falls within a predetermined range, the parameter being either the lift generated on the wing or a total thrust of the electric aircraft,
wherein the controller is configured to control a distribution of the lift of the wing in the slipstream of the propeller or fan,
wherein the controller is further configured to enable adjustment of a thrust provided by a first electric propulsion system of the plurality of electric propulsion systems to a thrust in a flight direction of the electric aircraft, and
wherein the controller is further configured to enable adjustment of a thrust provided by a second electric propulsion system of the plurality of electric propulsion systems to a thrust in a direction opposite to the flight direction of the electric aircraft.

2. The electric aircraft according to claim 1, wherein when the at least one variable relating to the operating state of an electric propulsion system of the plurality of electric propulsion systems changes, the controller adjusts the respective electric propulsion system on a basis of the relationship between the at least one variable relating to the operating state of the respective electric propulsion system and the lift generated on the wing such that the parameter has a predetermined value or falls within a predetermined range.

3. The electric aircraft according to claim 1, wherein when at least one variable relating to an operating state based on airflow information around the aircraft changes, the airflow information being obtained around the aircraft, or when at least one variable relating to an airflow state based on airflow information around the aircraft changes, the airflow information being obtained around the aircraft,
the controller adjusts each electric propulsion system on a basis of the relationship between the at least one variable relating to the operating state of the respective electric propulsion system and the lift generated on the wing such that the parameter has a predetermined value or falls within a predetermined range.

4. The electric aircraft according to claim 1, wherein when at least one variable relating to an operating state based on airflow information around the aircraft changes, the airflow information being obtained through communication from ground facility or by a mounted lidar or radar, or when at least one variable relating to an airflow state based on airflow information around the aircraft changes, the airflow information being obtained through communication from ground facility or by a mounted lidar or radar,
the controller adjusts each electric propulsion system on a basis of the relationship between the at least one variable relating to the operating state of the respective electric propulsion system and the lift generated on the wing such that the parameter has a predetermined value or falls within a predetermined range.

5. The electric aircraft according to claim 1, comprising a storage device that stores a data group of the relationship between the at least one variable relating to the operating state of each electric propulsion system and the lift generated on the wing.

6. The electric aircraft according to claim 1, wherein the controller
learns, as training data, one or more of a rotation speed, an output, a thrust, or a pitch angle of the propeller, a motor torque of the electric motor, the lift of the wing, or processing information thereof, and
obtains the relationship between the at least one variable relating to the operating state of each electric propulsion system and the lift generated on the wing from information relating to the rotation speed of the propeller, a motor output or the motor torque of the electric motor, or the processing information thereof.

7. The electric aircraft according to claim 1, wherein the controller is configured to adjust each electric propulsion system such that a thrust is decreased and the distribution of the lift is decreased in the propeller or fan closer to a wing tip, so that the distribution of the lift in a span direction is adjusted to have an elliptical shape.

8. The electric aircraft according to claim 1, wherein when a wind gust acts on the electric aircraft, the controller adjusts the plurality of electric propulsion systems to have the distribution of the lift of the wing, in which an acceleration or load caused by the wind gust received by the electric aircraft is reduced.

9. The electric aircraft according to claim 1,
wherein the controller is configured to switch the operating state of at least one of the propeller or fan to a regenerative operation and to adjust the second electric propulsion system to have the thrust in the direction opposite to the flight direction.

10. An aerodynamic performance control method for an electric aircraft, the method comprising:
driving at least one propeller or fan, for propulsion disposed at a front of a wing to contribute to a lift of the wing due to an act of a slipstream of the at least one propeller or fan on the wing at a rear of the slipstream of the at least one propeller or fan, by at least one respective electric motor;

adjusting a plurality of electric propulsion systems, each electric propulsion system including a propeller or fan, of the at least one propeller or fan, for propulsion and an electric motor, of the at least one electric motor, on a basis of a relationship between at least one variable relating to an operating state of the respective electric propulsion system and the lift generated on the wing such that a parameter has a predetermined value or falls within a predetermined range, the parameter being either the lift generated on the wing or a total thrust of the electric aircraft;

controlling a distribution of the lift of the wing in the slipstream of the at least one propeller or fan;

controlling the electric aircraft to enable adjustment of a thrust provided by a first electric propulsion system of the plurality of electric propulsion systems to a thrust in a flight direction of the electric aircraft; and controlling the electric aircraft to enable adjustment of a thrust provided by a second electric propulsion system of the plurality of electric propulsion systems to a thrust in a direction opposite to the flight direction of the electric aircraft.

11. The method according to claim 10, further comprising:

adjusting the plurality of electric propulsion systems such that a thrust is decreased and the distribution of the lift is decreased in the propeller or fan closer to a wing tip, so that the distribution of the lift in a span direction is adjusted to have an elliptical shape.

12. An electric aircraft, comprising:

at least one electric propulsion system, each electric propulsion system including a propeller or fan for propulsion disposed at a front of a wing to contribute to a lift of the wing due to an act of a slipstream of the propeller or fan on the wing at a rear of the slipstream of the propeller or fan, and an electric motor that drives the propeller or fan; and a controller that adjusts each electric propulsion system on a basis of a relationship between at least one variable relating to an operating state of the respective electric propulsion system and the lift generated on the wing such that a parameter has a predetermined value or falls within a predetermined range, the parameter being either the lift generated on the wing or a total thrust of the electric aircraft, wherein the controller is configured to control a distribution of the lift of the wing in the slipstream of the propeller or fan, wherein the controller is further configured to enable adjustment of a thrust provided by the at least one electric propulsion system to a thrust in a direction opposite to a flight direction of the electric aircraft, wherein the electric aircraft further comprises a storage device that stores a data group of the relationship between the at least one variable relating to the operating state of the electric propulsion system and the lift generated on the wing, and wherein, when a wind gust acts on the aircraft, the controller detects the action of the wind gust as a change in advance ratio, and alleviates changes in the lift of the wing and in bending moment of the wing on a basis of the data group stored in the storage device to have the distribution of the lift of the wing, in which an acceleration or load caused by the wind gust is reduced.

\* \* \* \* \*